Sept. 24, 1940.　　　W. D. TIPTON　　　2,216,057
CUFF VALVE ENGINE
Filed March 2, 1939　　　4 Sheets-Sheet 1

Inventor
William D. Tipton
By Raymond W. Colton
Attorney

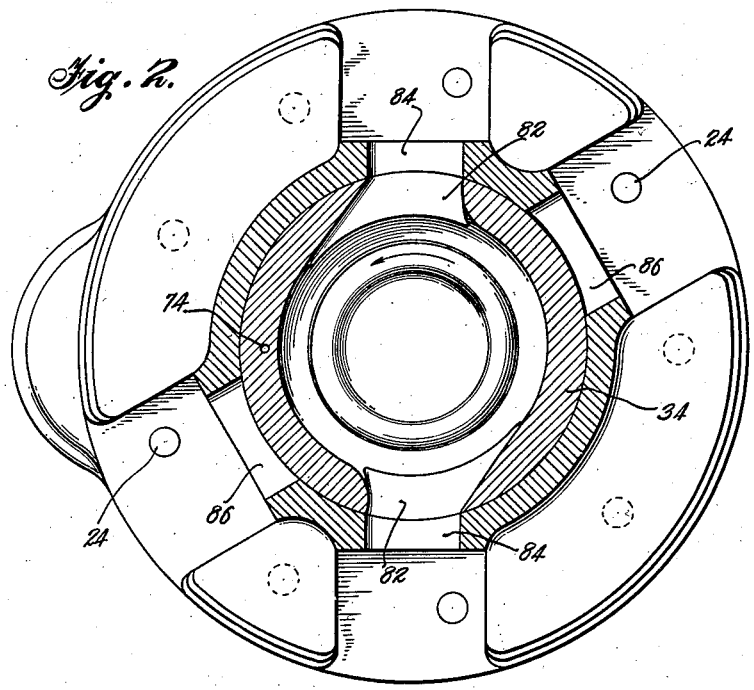
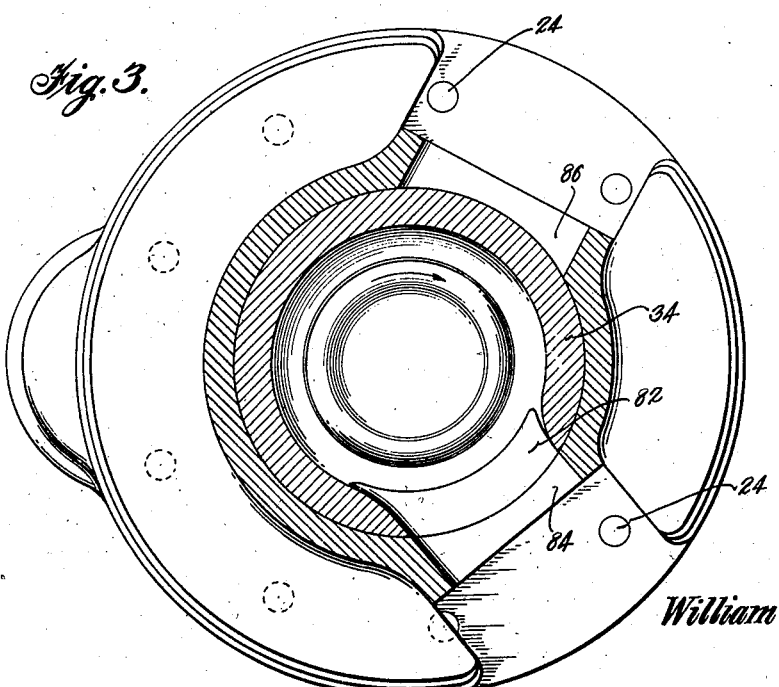

Sept. 24, 1940. W. D. TIPTON 2,216,057
CUFF VALVE ENGINE
Filed March 2, 1939 4 Sheets-Sheet 3
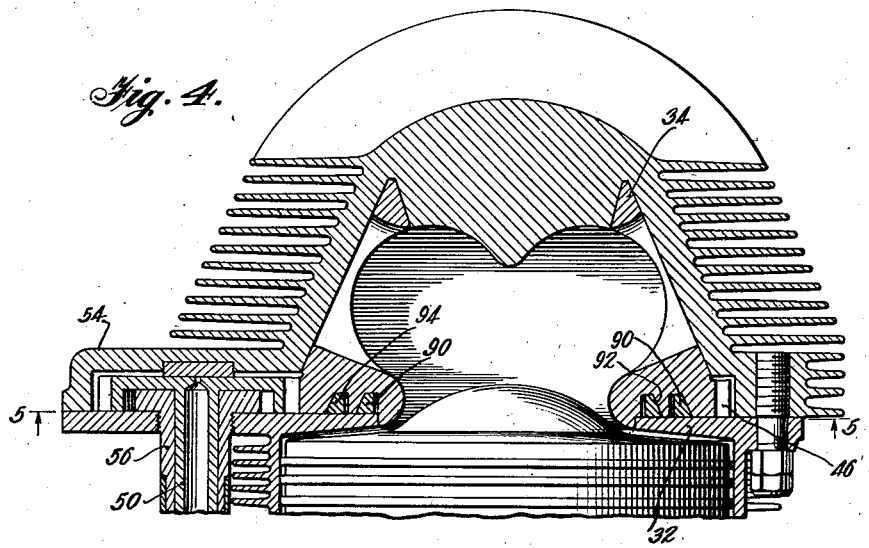
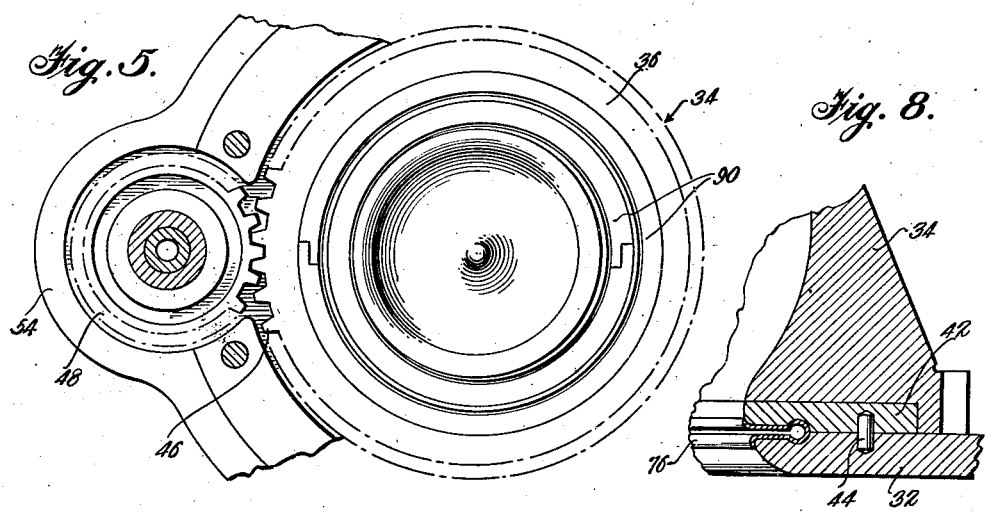
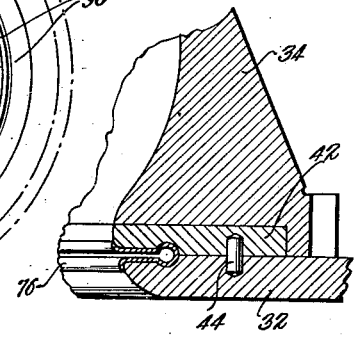
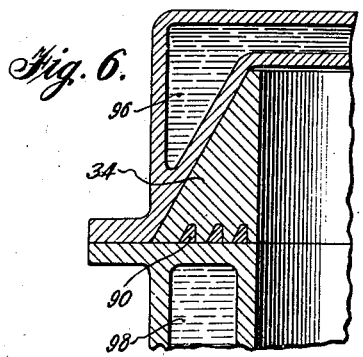
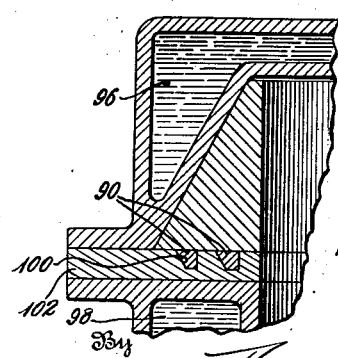
Inventor
William D. Tipton
By Raymond W Bolton
Attorney Sept. 24, 1940.  W. D. TIPTON  2,216,057
CUFF VALVE ENGINE
Filed March 2, 1939  4 Sheets-Sheet 4
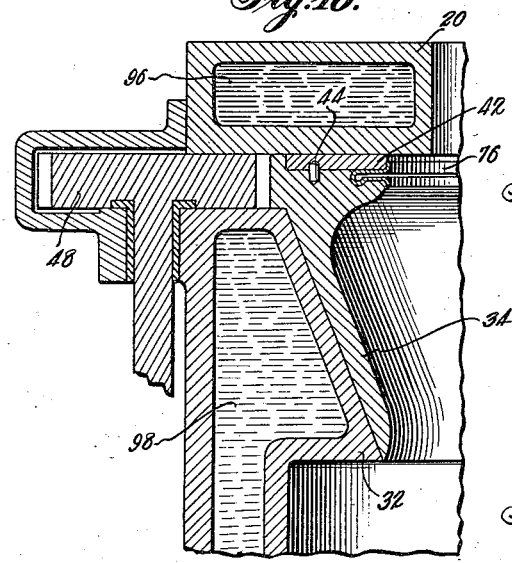
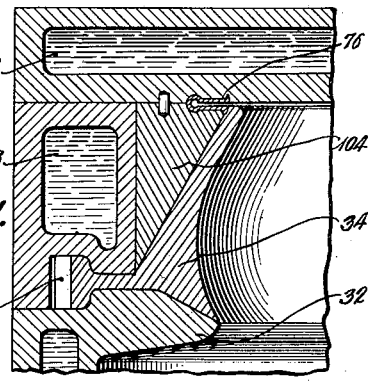
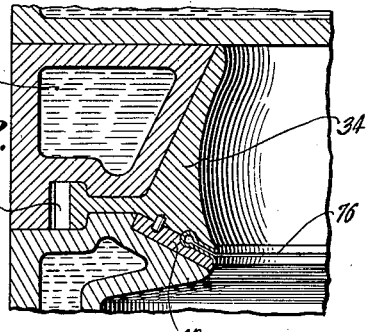
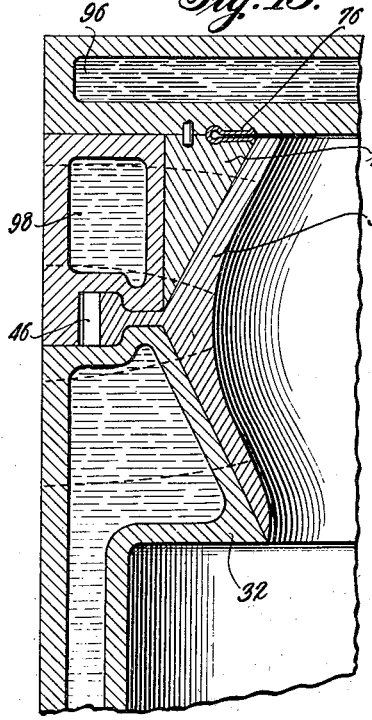
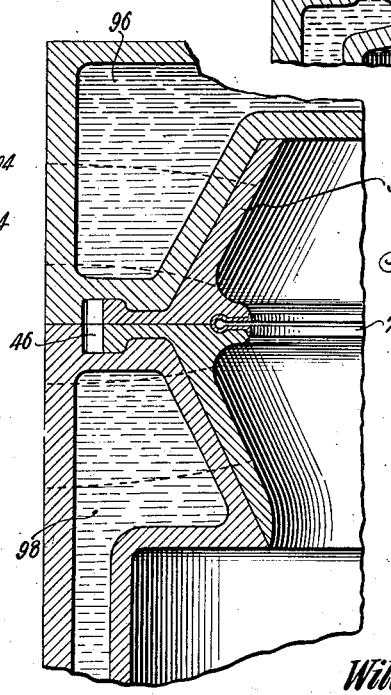
Inventor
William D. Tipton
By Raymond W. Colton
Attorney Patented Sept. 24, 1940

2,216,057

UNITED STATES PATENT OFFICE 2,216,057

CUFF VALVE ENGINE

William D. Tipton, Stoneleigh, Md.

Application March 2, 1939, Serial No. 259,451

15 Claims. (Cl. 123—190)

This invention relates to internal combustion engines of the rotary valve type.

In the construction and operation of internal combustion engines, rotary valves as a class are in many respects preferable to the more commonly used poppet valves. Among the advantages inherent to rotary valves are more positive actuation; greater accuracy in timing; fewer operating parts; ease of adjustment; reduced size and weight for an engine of given horsepower; elimination of hot spots; and avoidance of pre-ignition.

As between the various types of rotary valves known in the art, valves of the so-called cuff type possess certain advantages over full length sleeve valves. Reciprocation of a piston in contact with a surrounding rotating sleeve induces appreciable frictional losses and wear, resulting in reduced efficiency and shorter life of the parts. These factors are particularly significant in conjunction with high pressure aircraft engine design, where the piston ring problems already have introduced no end of trouble. With a view towards obviating these difficulties, the present invention contemplates a cuff valve construction in the form of a hollow rotary valve which has no frictional engagement with the reciprocating piston or its rings.

Cuff valve constructions have been proposed prior to the present application, but every known case has contained such objectionable aspects as to preclude its adoption to any appreciable extent. The principal difficulties have been excessive friction between the valve and its seat during the compression and firing strokes on the one hand, or inadequate sealing of the ports and leakage of gases on the other. Prominent among the prior constructions, are those proposed in the United States patents to White, 1,304,839, granted on May 27, 1919, and Echard, 1,427,726, granted on August 29, 1922; and in the French patent to Vallotton, et al., 449,443, published on February 26, 1913.

It is proposed by the present invention to overcome the faults and limitations of cuff valve engines already known in the art by providing a construction wherein the valve is substantially balanced as far as combustion chamber pressures are concerned, even during the compression and firing strokes, and at the same time is sealed against leakage of gases regardless of the pressures developed. In a sense, this invention solves problems in the cuff valve art similar to those existing in the sleeve art prior to the invention set forth by the present applicant in his copending application Serial No. 202,945, filed April 19, 1938, now Patent No. 2,158,442, dated May 16, 1939, and of which this application may be deemed a continuation in part.

In accordance with the present invention, the cylinder of an internal combustion engine has its head end provided with a transversely directed seat substantially adjacent to but beyond the path of travel of the piston. A rotary valve provided with a transversely directed surface is supported on this seat, and the valve is also provided with a convergent external surface or periphery which complements an internal convergent surface provided within the cylinder head. The cylinder port or ports are formed through these convergent surfaces, which surfaces are urged in contact by expansible sealing means. The expansible means at the same time may be resilient and/or subject to combustion chamber pressure for the purpose of pressing the convergent surfaces into fluid tight engagement.

By virtue of the arrangement of the transverse surfaces and sealing means, the forces acting on the valve due to combustion chamber pressures are substantially balanced under all conditions of pressure, there being only a relatively slight bias required to maintain the convergent surfaces in contact for producing the seal. This component may be due to combustion chamber pressure and/or the inherent resiliency of the sealing means. In some instances it is contemplated to interpose a thrust bearing between the transverse surfaces of the valve and cylinder with a view towards reducing friction, under which conditions, the expansible element may be interposed between the thrust bearing and one of the transverse surfaces.

The transverse surface carried by the cylinder will in some cases constitute a flange overhanging the cylinder bore, serving not only to support the valve, but likewise directing the gases during compression towards the center of the combustion chamber, thus setting up a high degree of turbulence, tending to break down the flame front and substantially reduce detonation. Directed in part towards this same end, the valve, cylinder head and piston head may receive cooperating curved surfaces, which in one case may impart to the combustion chamber a substantially spherical shape, while in another, a substantially toroidal shape. These combustion chamber shapes are at the same time practical to produce and sound from the standpoint of design.

The convergent surface carried by the cylinder head for mating relationship with the valve, may be a separate element in the form of a sealing ring, in which case, the expansible means may be interposed between the valve and cylinder head. In other cases, the expansible means may be positioned between the valve and its seat. The nature of the expansible means may vary, in some cases assuming the form of a substantially U-shape gasket or pressure packing, while in others, beveled split rings may be positioned in corresponding grooves, in any case however, tending to urge the convergent surfaces carried by the valve and cylinder head together to assure an adequate seal against the escape of gases.

Where beveled split rings are employed, it is preferable to position them with a slight eccentricity relative to the valve, thus avoiding the formation of narrow grooves in the bearing surfaces through extended use. Where a plurality of such rings are employed, their eccentricity will preferably exceed the spaces between the rings in order that their paths will overlap.

A more complete understanding of the present invention will follow from a description with reference to the accompanying drawings wherein:

Fig. 2 is a section taken along line 2—2 of Fig. 1 showing a port arrangement where the valve rotates at one-fourth of the crank shaft speed;

Fig. 3 is a section similar to Fig. 2 where the ports are arranged for rotation of the valve at one-half crank shaft speed;

Fig. 4 is a partial elevation in section showing a modification;

Fig. 5 is a view taken along a portion of line 5—5 of Fig. 4;

Figs. 6, 7 and 8 are fragmentary sections depicting modifications;

Figs. 10, 11, 12, 13 and 14 are fragmentary sectional elevations of other modifications.

Figure 1:
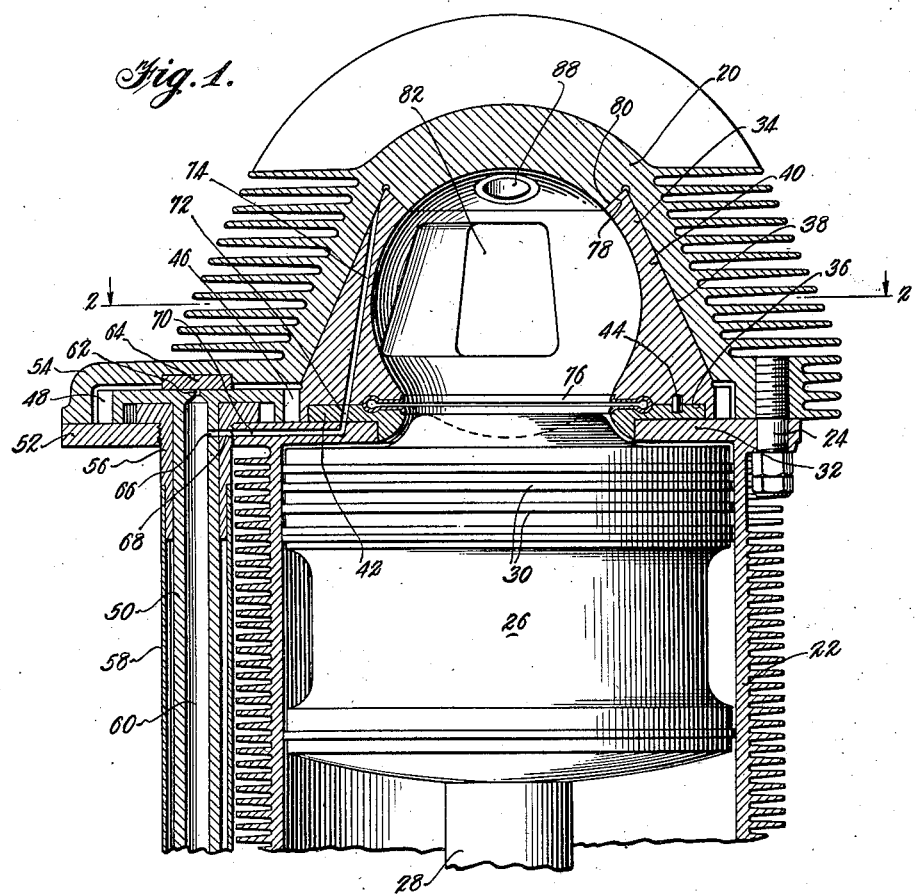
Fig. 1 is an elevation in section, partially broken away, illustrating one form of the invention.

As shown in Fig. 1 of the drawings, a finned cylinder head 20 is attached to a finned cylinder 22 by means of a suitable number of bolts 24. A piston 26 is mounted for reciprocation within the cylinder and is provided with the customary connecting rod 28 and piston rings 30. Adjacent the end of travel of the piston, the cylinder is provided with a transversely directed overhanging flange 32 which serves to support a rotary valve 34. The base of the valve comprises a transversely directed surface 36 while its periphery 38 is upwardly convergent and assumes the form of a frustrated cone. The cylinder head is provided with a seat or bore 40 which is likewise convergent or frustro-conical to complement the convergent surface 38 of the valve. Between the base of the valve and the flange 32, there is interposed a thrust bearing 42 intended in this form of the invention to rotate with the valve and yet be axially movable with respect thereto. For this purpose, one or more pins 44 loosely penetrate registering openings formed in the contiguous surfaces of the valve and the thrust bearing.

The lower portion of the valve periphery is provided with teeth 46 defining an annular gear for meshing engagement with a driving spur 48. The teeth 46 may be formed integrally with the valve or attached in a suitable manner. The spur 48 is carried by a shaft 50 which derives its motion from the engine crank shaft, not shown. The gearing at the lower end of the valve and the spur are housed in a casing defined by an outwardly directed flange 52 formed on the cylinder and a cooperating flange 54 carried by the cylinder head. The shaft 50 extends downwardly through a journal 56 suitably mounted in the cylinder flange 52, and a tube 58 leading from the journal to the engine crank case. The shaft 50 is provided with an axial bore 60 through which oil may be fed to the rotary valve mechanism. A portion of the lubricant passing upwardly through the bore from a suitable source, will pass through a small opening 62 formed through the upper surface of the spur to lubricate a thrust bearing 64 mounted in the cylinder head flange 54. Another portion of the lubricant will pass through a transverse bore 66 formed in the shaft, into a registering transverse bore 68 formed in the journal, a registering channel 70 drilled partially through the overhanging cylinder flange 32, emerging at the upper surface of the flange and passing through a bore 72 formed in the thrust bearing 42, into a channel 74 extending from the base of the valve 34 to a point near the upper end of its periphery. The lubricant will emerge at the base of the valve and near the upper end of its convergent surface to lubricate all of the relatively moving surfaces. As result of centrifugal force due to the valve rotation, oil will flow downwardly between the convergent surfaces into the gear housing, lubricating the gears and journal, and will then return to the crank case or other source through the tube 58.

An expansible packing or sealing element 76 of substantially U-shape is inserted between the lower surface of the valve 34 and the upper surface of the thrust bearing 42. This packing element may be constructed of resilient material so as to normally bias the valve 34 towards the convergent seat 40 carried by the cylinder head.

As shown, the upper end of the valve possesses a slight taper 78 interfitting a corresponding taper 80 formed in the head. The valve is provided with a pair of ports 82 which register periodically with the inlet ports 84 and the outlet ports 86 formed in the cylinder head, as depicted in Fig. 2 of the drawings, and it will be understood that the valve in this figure is designed to rotate at one-fourth of the crank shaft speed.

The surfaces of the cylinder head, valve and piston which define the combustion chamber have been shown in Fig. 1, partially in broken lines, as curved to define a substantially spherical combustion chamber. An opening 88 may be formed at the top of the cylinder head for the reception of a spark plug or alternatively, in accordance with known practice, a spark plug may be located at the side of the cylinder head so as to be exposed periodically by the rotation of the valve.

Assuming that the length of the legs of the sealing element 76 is equal to the horizontal component of the tapered surface 80 formed at the top of the valve, it will be seen that the valve will be substantially balanced under all conditions of combustion chamber pressure to which it may be subjected, inasmuch as the surfaces exposed to upward forces will equal those exposed to downwardly acting forces. If the sealing element is normally resilient so as to constantly urge the convergent surfaces of the valve and cylinder head into fluid tight relationship, the length of the legs of the U-shaped element 76 may be as assumed above. In the event that it is desired to utilize a packing element which is not resilient, it will then be preferable to increase the length of the legs of the U-shaped member 76 so that the resultant force acting upon the valve will be an upward one, thereby obtaining the desired seal between the convergent surfaces. As a matter of fact, it is preferable to impart a slight bias due to combustion chamber pressure whether or not the sealing means is resilient.

It will be realized that the overhanging flange 32 serves not only to support the valve, but during the compression stroke of the piston tends to direct the gases towards the center of the combustion chamber, which gases will meet at the center and be forced outwardly in arcuate paths, creating such a degree of turbulence, that the flame front following ignition will be broken down to reduce if not entirely avoid the troublesome and wasteful phenomenon of detonation.

The section shown in Fig. 3 of the drawings is similar to that of Fig. 2 with the exception that the valve 34 contains only one port 82 and the cylinder but one inlet port 84 and one exhaust port 86. Whereas such a construction may be preferred for some purposes, it will be noted that with only one port in the valve, there will be a tendency for it to become canted due to unequal pressure distribution and bind on the surface opposite the port. This will follow from the fact that the valve surfaces exposed to the combustion chamber pressure will not be the same at all diametrically opposite points. Where the valve is provided with two ports as illustrated in Fig. 2, the forces acting at all diametrically opposite points will be the same and the tendency to bind will not be present even at exceedingly high pressures.

The modification shown in Figs. 4 and 5 of the drawings differs primarily from that already described, in two respects. In lieu of the U-shaped sealing element of Fig. 1, one or more split rings 90 having downwardly divergent outer surfaces 92 are received in complementary grooves 94 formed in the lower transverse surface of the valve. These rings will preferably be normally resilient with a tendency to expand, thereby urging the valve 34 upwardly so that its outer convergent surface will be maintained in fluid tight relationship with the complementary convergent surface carried by the cylinder head. It will be understood of course that these split rings are exposed to combustion chamber pressures and accordingly help to maintain the valves in their necessary sealing relationship. In this modification, it will be noted that no thrust bearing has been interposed between the valve and its seat, but this variation may be made if desired. In order to avoid the formation of deep grooves as result of the rings 90 bearing upon the overhanging flange 32, or an interposed bearing as the case may be, the rings are mounted slightly eccentrically relative to the valve axis, the amount of the eccentricity being preferably slightly greater than the spacing between the rings so that their paths will be overlapping. As result of this construction, the wear will be uniform and the life of the parts extended.

The shape of the combustion chamber shown in Fig. 4 of the drawings is also of importance, the cylinder head, valve and piston being conformed to define a chamber of substantially toroidal shape. Under these conditions, as the gases are forced upwardly during the compression stroke, their contact with the overhanging flange 32 will direct them inwardly and their mutual contact at the center of the combustion chamber will direct them outwardly in somewhat circular paths, setting up such a degree of turbulence as to materially reduce detonation. In this form of construction, one or more spark plugs may be inserted at the side of the cylinder to be uncovered by the valve at the prescribed times.

Fig. 6 illustrates a modification using tapered split rings 90 of the type described with reference to Fig. 4, for obtaining the desired seal. In this case, the valve is seated on a transverse surface carried by the cylinder which does not overhang the cylinder bore. This figure also illustrates a cylinder head jacket 96 and a jacket 98 in the block, indicating that the invention is equally applicable to engines of the water cooled type.

Fig. 7 likewise depicts a water cooled engine wherein the valve supporting seat does not overhang the bore. In this case the resilient split rings 90 are downwardly convergent and received in complementary grooves 100 formed in a thrust bearing 102 interposed between the transverse surfaces of the valve and cylinder. It will be evident that the action of the gases upon the sealing rings will force them outwardly and upwardly to maintain the convergent surfaces of the valve and cylinder head in fluid tight relationship.

Fig. 8 depicts a modification of the construction shown in Fig. 1 wherein the U-shaped sealing element 76 is interposed between the thrust bearing 42 and the transverse overhanging flange 32 of the cylinder. In this case, the pin 44 maintains the thrust bearing non-rotatable with respect to the cylinder but permits axial movement for the maintenance of a seal in a manner similar to that described with respect to Fig. 1.

Figure 9:
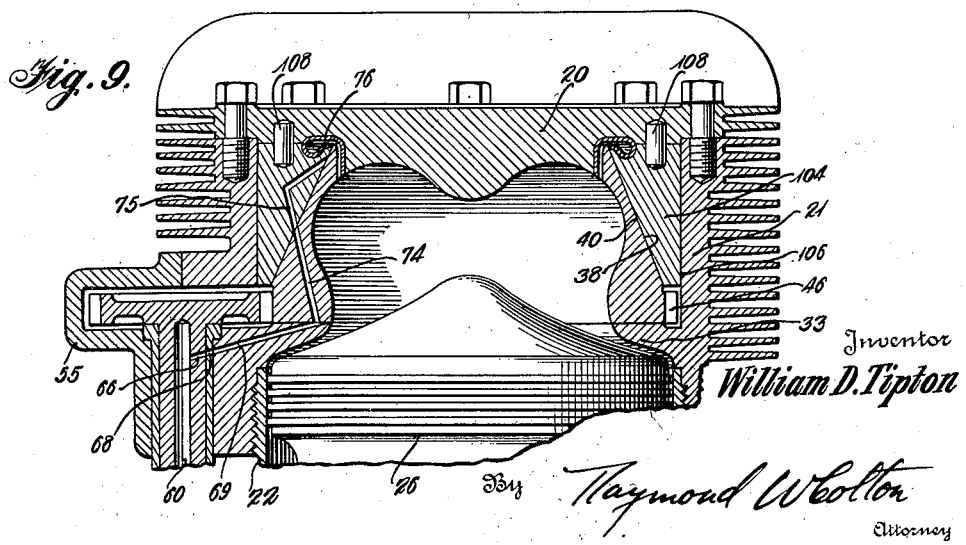
Fig. 9 is a partial sectional elevation illustrating a further modification.

In the modification shown in Fig. 9 of the drawings, the sealing element is interposed intermediate the cylinder head and the valve, or it might be said, between the head and a sealing ring, to be described. The head assembly comprises two parts, a barrel 21 threaded upon the cylinder sleeve 22, and the head closure 20, bolted to the barrel. In this construction the convergent surface carried by the cylinder head assembly is in the form of a separate sealing ring 104 having an outer periphery 106 adapted for axial movement and an internal convergent surface or seat 40 complementing the convergent surface 38 formed on the valve. The sealing ring 104 is held against rotation in the cylinder by one or more pins 108, fitted to prevent rotation and yet permit slight axial movement of the ring with respect to the cylinder.

In this case, the transversely directed overhanging flange 33 is depicted as integral with the cylinder barrel 21, its functions being similar to those of the constructions already described. The gear housing will be closed in this construction by a suitable cap 55, which may be bolted to the barrel.

Since here again the valve is substantially balanced within the head due to the upwardly and downwardly acting forces as result of combustion chamber pressure, the bias of the convergent surfaces into contact for maintaining a fluid tight seal is accomplished by the normal resilience of the sealing element 76 and/or an increase in the length of its legs as described in conjunction with Fig. 1 of the drawings. It will be noted that the minimum internal diameter of the valve and its external diameter at the upper end are substantially equal, thus further tending to obtain the balanced condition sought. In this case, the sealing ring 104 will tend to move downwardly to accomplish the desired result. It will be evident that the ports will be formed not only through the valve and cylinder, but likewise through the sealing ring in a manner similar to that described in conjunction with the Patent No. 2,158,442, May 16, 1939 alluded to in the foregoing.

Lubricant will be fed through the bores 60, 66 and 68 as before, into a channel 69 in the cylinder barrel, emerging at the face of the transversely directed flange 33, up through a bore 74 in the valve and into a reentrant bore 75 in the sealing ring to a point near the upper end of the complementary convergent surfaces. As before, the oil will then pass down between the convergent surfaces and return to its source.

The modification depicted in Fig. 10 of the drawings exemplifies another form of the invention adapted for water cooled cylinder and heads. The cylinder is provided with a transversely directed overhanging flange 32 upon which the wall is outwardly divergent for cooperation with a complementary surface formed on the periphery of the valve 34. In this instance, the outer end of the valve is provided with a transversely directed surface, provided with a thrust bearing 42 seated upon the internal surface of the head 20. Here again, the valve is substantially balanced as result of combustion chamber pressures, but it has imparted thereto a sufficient bias towards the port containing wall of the cylinder to assure an adequate seal. The bias is effected by an expansible packing or sealing element 76 interposed between the valve and cylinder head. The valve is rotated by means of a spur 48 in a manner similar to that described in conjunction with the preceding figures. The principal difference in the drive in this case is that the gearing is located nearer the outer end of the cylinder.

In Fig. 11, the rotary valve 34 is supported upon a transversely directed surface formed on an overhanging flange carried by the cylinder, and in this case the surface is somewhat inclined with respect to a perpendicular drawn to the cylinder axis. The port containing surface of the valve is outwardly convergent and cooperates with a complementary sealing ring 104 similar to that described with reference to Fig. 9 of the drawings. The sealing element 76 is again interposed between the sealing ring and the cylinder head. The driving spur has been omitted from the sections shown in this and several of the other figures, but it will be understood that some form of the valve rotating means is contemplated for each of the constructions shown.

In Fig. 12, the angularity of the transversely directed valve surface is substantially the same as in Fig. 11, but in this case the sealing ring 104 has been omitted and the port bearing walls of the valve and cylinder are in direct contact. A thrust bearing 42 is interposed between the transversely directed surface of the valve and overhanging cylinder flange. The sealing element 76 is arranged between the valve and its bearing for the purpose of effecting a fluid tight seal between the port bearing surfaces.

In Fig. 13, the valve 34 possesses upwardly and downwardly convergent legs, each of which is provided with ports as indicated in broken lines. A sealing ring 104 is provided with a convergent surface complementing that of the upper leg of the valve and an expansible sealing element 76 is interposed between the sealing ring and cylinder head. The cylinder is provided with an overhanging flange 32 and a convergent or transversely directed surface complementary to the lower leg of the valve. It will be evident that here again the valve will be substantially balanced as result of combustion chamber pressures except for the effect of such pressures upon the expansible sealing element which biases the valve towards its seats.

In Fig. 14, a valve somewhat similar in form to that shown in Fig. 13 is centrally divided and an expansible sealing element 76 is interposed between its two sections. As shown, the valve sections are provided with upwardly and downwardly convergent surfaces respectively, which cooperate with the cylinder walls complementary thereto. Again, the ports have been indicated in broken lines. The teeth 46 may be integral or attached to the valve sections as in the preceding figures, but it is necessary in this form that the valve sections have the possibility of relative axial movement in order that expansion of the sealing element will bias the two faces of the valve towards their respective seats.

It will be understood that the constructions described above serve merely as examples of the invention and are not to be construed in their restrictive sense. For example, the mode of lubrication depicted in Fig. 1 may be utilized in conjunction with any one or more of the other figures. Similarly, the sealing means of the various types described can be interchanged, and the spark plugs may be located at various points in the head in accordance with known practice. And in a similar manner, the shape of the combustion chamber in any construction may be varied in accordance with known practice or with the designs herein set forth. Consequently, the scope of this invention is to be measured not by the limitations of the foregoing illustrations, but only in accordance with the appended claims.

I claim:

1. An internal combustion engine comprising a cylinder and head therefor, a piston in said cylinder, a transversely directed seat provided near the head end of said cylinder adjacent the end of the travel of said piston, a rotary valve provided with a transversely directed surface supported by said seat, a convergent external surface on said valve, a complementary convergent surface carried by said head, ports formed in said convergent surfaces, and expansible means tending to maintain said convergent surfaces in contact.

2. An internal combustion engine comprising a cylinder and head therefor, a piston in said cylinder, a transversely directed seat provided near the head end of said cylinder adjacent the end of the travel of said piston, a rotary valve provided with a transversely directed surface supported by said seat, a peripheral convergent surface on said valve, a complementary convergent surface carried by said head, ports formed in said convergent surfaces, and resilient expansible means tending to maintain said convergent surfaces in contact.

3. An internal combustion engine comprising a cylinder and head therefor, a piston in said cylinder, a transversely directed seat provided near the head end of said cylinder adjacent the end of the travel of said piston, a rotary valve provided with a transversely directed surface supported by said seat, a peripheral convergent surface on said valve, a complementary convergent surface carried by said head, ports formed in said convergent surfaces, and expansible means responsive to pressure in said cylinder tending to maintain said convergent surfaces in contact.

4. An internal combustion engine comprising a cylinder and head therefor, a piston in said cylinder, a transversely directed seat provided near the head end of said cylinder adjacent the end of the travel of said piston, a rotary valve substantially balanced as regards internal cylinder pressure provided with a transversely directed surface supported by said seat, a peripheral convergent surface on said valve, a complementary convergent surface carried by said head, ports formed in said convergent surfaces, and expansible means urging said convergent surfaces into fluid tight contact.

5. An internal combustion engine comprising a cylinder and head therefor, a piston in said cylinder, a transversely directed seat provided near the head end of said cylinder adjacent the the end of the travel of said piston, a rotary valve provided with a transversely directed surface supported by said seat, a bearing element interposed between said seat and valve, a peripheral convergent surface on said valve, a complementary convergent surface carried by said head, ports formed in said convergent surfaces, and expansible means tending to maintain said convergent surfaces in contact.

6. An internal combustion engine comprising a cylinder and head therefor, a piston in said cylinder, a flange directed inwardly from said cylinder adjacent the end of the travel of said piston, a rotary valve provided with a transversely directed surface supported by said flange, a peripheral convergent surface on said valve, a complementary convergent surface carried by said head, ports formed in said convergent surfaces, and expansible means tending to maintain said convergent surfaces in contact.

7. An internal combustion engine comprising a cylinder and head therefor, a piston in said cylinder, a transversely directed seat provided near the head end of said cylinder adjacent the end of the travel of said piston, a rotary valve provided with a transversely directed surface supported by said seat, a peripheral convergent surface on said valve, a complementary convergent surface carried by said head, ports formed in said convergent surfaces, and expansible means intermediate said valve and said seat tending to maintain said convergent surfaces in contact.

8. An internal combustion engine comprising a cylinder and head therefor, a piston in said cylinder, a transversely directed seat provided near the head end of said cylinder adjacent the end of the travel of said piston, a rotary valve provided with a transversely directed surface supported by said seat, a peripheral convergent surface on said valve, a complementary convergent surface carried by said head, ports formed in said convergent surfaces, and expansible means intermediate said valve and said head tending to maintain said convergent surfaces in contact.

9. An internal combustion engine comprising a cylinder and head therefor, a piston in said cylinder, a transversely directed seat provided near the head end of said cylinder adjacent the end of the travel of said piston, a rotary valve provided with a transversely directed surface supported by said seat, a peripheral convergent surface on said valve, a sealing ring carried by said head having a convergent surface complementary to that of said sleeve, ports formed in said convergent surfaces, and expansible means tending to maintain said convergent surfaces in contact.

10. An internal combustion engine comprising a cylinder and head therefor, a piston in said cylinder, a transversely directed seat provided near the head end of said cylinder adjacent the end of the travel of said piston, a rotary valve provided with a transversely directed surface supported by said seat, a convergent external surface on said valve, a complementary convergent surface carried by said head, ports formed in said convergent surfaces, a resilient ring interposed between said valve and said seat, and a tapered surface on said ring tending to urge said convergent surfaces in contact upon expansion of said ring.

11. An internal combustion engine comprising a cylinder and head therefor, a piston in said cylinder, a transversely directed seat provided near the head end of said cylinder adjacent the end of the travel of said piston, a rotary valve provided with a transversely directed surface supported by said seat, a convergent external surface on said valve, a complementary convergent surface carried by said head, ports formed in said convergent surfaces, a resilient ring interposed between said valve and said seat and eccentrically disposed with respect thereto, said ring tending to maintain said convergent surfaces in contact.

12. An internal combustion engine comprising a cylinder and head therefor, a piston in said cylinder, a valve seat carried by said head, a rotary valve in said head maintained in substantial balance as a result of combustion chamber pressures, and expansible packing means exposed to combustion chamber pressure relatively biasing said valve and seat together.

13. An internal combustion engine comprising a cylinder and head therefor, a piston in said cylinder, a valve seat carried by said head, a rotary valve in said head maintained in substantial balance as result of combustion chamber pressures, and expansible packing means responsive to combustion chamber pressure to relatively urge said valve towards said seat.

14. An internal combustion engine comprising a cylinder and head therefor, a piston in said cylinder, a transversely directed seat provided near the head end of said cylinder adjacent the end of the travel of said piston, a rotary valve provided with a transversely directed surface supported by said seat, a peripheral convergent surface on said valve, a sealing ring carried by said head having a convergent surface complementary to that of said valve, ports formed in said convergent surfaces, and resilient expansible means tending to maintain said convergent surfaces in contact.

15. An internal combustion engine comprising a cylinder and head therefor, a piston in said cylinder, a transversely directed seat provided near the head end of said cylinder adjacent the end of the travel of said piston, a rotary valve provided with a transversely directed surface supported by said seat, a peripheral convergent surface on said valve, a sealing ring carried by said head having a convergent surface complementary to that of said valve, ports formed in said convergent surfaces, and expansible means subject to cylinder pressure tending to maintain said convergent surfaces in contact.

WILLIAM D. TIPTON.